United States Patent
Gesper

(10) Patent No.: US 9,669,576 B2
(45) Date of Patent: Jun. 6, 2017

(54) METHOD AND DEVICE FOR CONTROLLING THE TEMPERATURE OF POLYMER MELT

(71) Applicant: battenfeld-cincinnati Germany GmbH, Bad Oeynhausen (DE)

(72) Inventor: Thomas Gesper, Delbrueck (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 887 days.

(21) Appl. No.: 13/898,568

(22) Filed: May 21, 2013

(65) Prior Publication Data

US 2013/0313747 A1    Nov. 28, 2013

(30) Foreign Application Priority Data

May 23, 2012    (DE) .......................... 10 2012 208 677

(51) Int. Cl.
*B29C 47/78*    (2006.01)
*B29C 47/48*    (2006.01)
(Continued)

(52) U.S. Cl.
CPC .......... *B29C 47/78* (2013.01); *B29C 47/0026* (2013.01); *B29C 47/20* (2013.01);
(Continued)

(58) Field of Classification Search
CPC ..... B29C 47/78; B29C 47/825; B29C 47/822; B29C 47/92; B29C 47/20; B29C 47/862; B29C 47/866; B29C 47/22; B29C 47/882; B29C 47/864; B29C 2947/92904; B29C 2947/92704
(Continued)

(56) References Cited

U.S. PATENT DOCUMENTS 4,784,595 A * 11/1988 Halter ..................... B29C 47/10
                                                       264/40.6
5,355,938 A * 10/1994 Hosoya .............. G05D 23/1919
                                                       165/263
(Continued)

FOREIGN PATENT DOCUMENTS

DE    42 35 164 C1    6/1994
DE    103 15 906 A1    4/2004
(Continued)

*Primary Examiner* — Nahida Sultana

(74) *Attorney, Agent, or Firm* — Leydig, Voit & Mayer, Ltd.

(57) ABSTRACT

A method for controlling the temperature of a polymer melt in an extrusion tool includes flowing the polymer melt via at least one flow channel from an input to an output and around at least one temperature-control element in the at least one flow channel. The temperature control element includes a plurality of temperature control units. The temperature of the polymer melt flowing around the temperature-control element is controlled by individually controlling each of the temperature-control units so as to vary a degree of temperature control of the temperature-control element such that a degree of temperature control is controllable to be the same or different at locations throughout the temperature control-element.

8 Claims, 4 Drawing Sheets

(51) Int. Cl.

| | |
|---|---|
| *B29C 47/20* | (2006.01) |
| *B29C 47/22* | (2006.01) |
| *B29C 47/86* | (2006.01) |
| *B29C 47/88* | (2006.01) |
| *B29C 47/92* | (2006.01) |
| *B29C 47/82* | (2006.01) |
| *B29C 47/00* | (2006.01) |
| *B29C 47/08* | (2006.01) |
| *B29C 47/90* | (2006.01) |

(52) U.S. Cl.
CPC ............ *B29C 47/22* (2013.01); *B29C 47/822* (2013.01); *B29C 47/825* (2013.01); *B29C 47/862* (2013.01); *B29C 47/864* (2013.01); *B29C 47/866* (2013.01); *B29C 47/882* (2013.01); *B29C 47/8895* (2013.01); *B29C 47/92* (2013.01); *B29C 47/0023* (2013.01); *B29C 47/0811* (2013.01); *B29C 47/905* (2013.01); *B29C 2947/92209* (2013.01); *B29C 2947/92704* (2013.01); *B29C 2947/92904* (2013.01); *B29C 2947/92971* (2013.01)

(58) Field of Classification Search
USPC ................ 425/143, 144, 378.1; 264/40.6
See application file for complete search history.

(56) References Cited

U.S. PATENT DOCUMENTS

| | | | | |
|---|---|---|---|---|
| 5,447,190 A | * | 9/1995 | Denisart | F28F 1/20 165/183 |
| 5,525,050 A | * | 6/1996 | Takizawa | B29C 45/78 264/40.6 |
| 8,287,268 B1 | * | 10/2012 | Thomas | A23P 1/027 425/144 |
| 2004/0159966 A1 | * | 8/2004 | Yamaguchi | B29C 47/0023 264/40.6 |
| 2004/0247760 A1 | * | 12/2004 | Howsam | B29C 47/864 426/516 |
| 2005/0048178 A1 | * | 3/2005 | Alexander | B29C 47/864 426/516 |
| 2005/0048179 A1 | * | 3/2005 | Alexander | B29C 47/86 426/516 |
| 2006/0118980 A1 | * | 6/2006 | Yamada | B29C 47/0021 264/28 |
| 2008/0136066 A1 | * | 6/2008 | Taylor | H05B 6/107 264/486 |
| 2008/0213562 A1 | * | 9/2008 | Przybylinski | B29B 17/00 428/300.4 |
| 2009/0000767 A1 | * | 1/2009 | Sevakivi | F28D 1/06 165/80.2 |
| 2009/0174107 A1 | * | 7/2009 | Kossl | B29C 47/0028 264/167 |
| 2010/0219558 A1 | * | 9/2010 | Fujita | B29C 47/0021 264/211.12 |
| 2012/0013034 A1 | * | 1/2012 | Hackl | B29C 47/0026 264/40.6 |

FOREIGN PATENT DOCUMENTS

| | | |
|---|---|---|
| DE | 10 2007 050 291 A1 | 4/2009 |
| JP | 06008307 A | 1/1994 |
| WO | WO 2006/050549 A2 | 5/2006 |

* cited by examiner

METHOD AND DEVICE FOR CONTROLLING THE TEMPERATURE OF POLYMER MELT

CROSS REFERENCE TO RELATED APPLICATIONS

This application claims priority to German Patent Application No. DE 10 2012 208 677.3, filed May 23, 2012, which is hereby incorporated by reference herein in its entirety.

FIELD

The invention relates to a method for controlling the temperature of a polymer melt in an extrusion tool, in particular a pipe extrusion tool, the polymer melt flowing via one or more flow channels from at least one melt input to at least one melt output, the polymer melt between the melt input and melt output flowing around at least one temperature-control element in the flow channel, and to a device in this regard.

BACKGROUND

In order to produce pipes, it is necessary to shape the cylindrical plastics melt flow produced by an extruder using a subsequent tool into an annular-gap-like melt flow. To this end, it is necessary for the melt flow originating from the extruder to be transferred in the tool by means of a centrally arranged mandrel into the corresponding annular flow. Such a device is proposed in DE 103 15 906.

Nowadays, short extrusion lines are often required. This can be achieved only when the cooling of the extruded profiles is optimised. At best, the melt is already cooled in the tool to such an extent that, although it is still deformable, the melt temperature is substantially lower than after leaving the extruder.

In this instance, DE 10 2007 050 291 proposes a division of the melt in the tool, the individual strands are cooled and subsequently combined again.

However, such a tool is difficult to operate for technical reasons relating to the method, since the flow behaviour of the cooled individual strands must be coordinated.

SUMMARY

In an embodiment, the present invention provides a method for controlling the temperature of a polymer melt in an extrusion tool includes flowing the polymer melt via at least one flow channel from an input to an output and around at least one temperature-control element in the at least one flow channel. The temperature-control element includes a plurality of temperature control units. The temperature of the polymer melt flowing around the temperature-control element is controlled by individually controlling each of the temperature-control units so as to vary a degree of temperature control of the temperature-control element such that a degree of temperature control is controllable to be the same or different at locations throughout the temperature control-element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
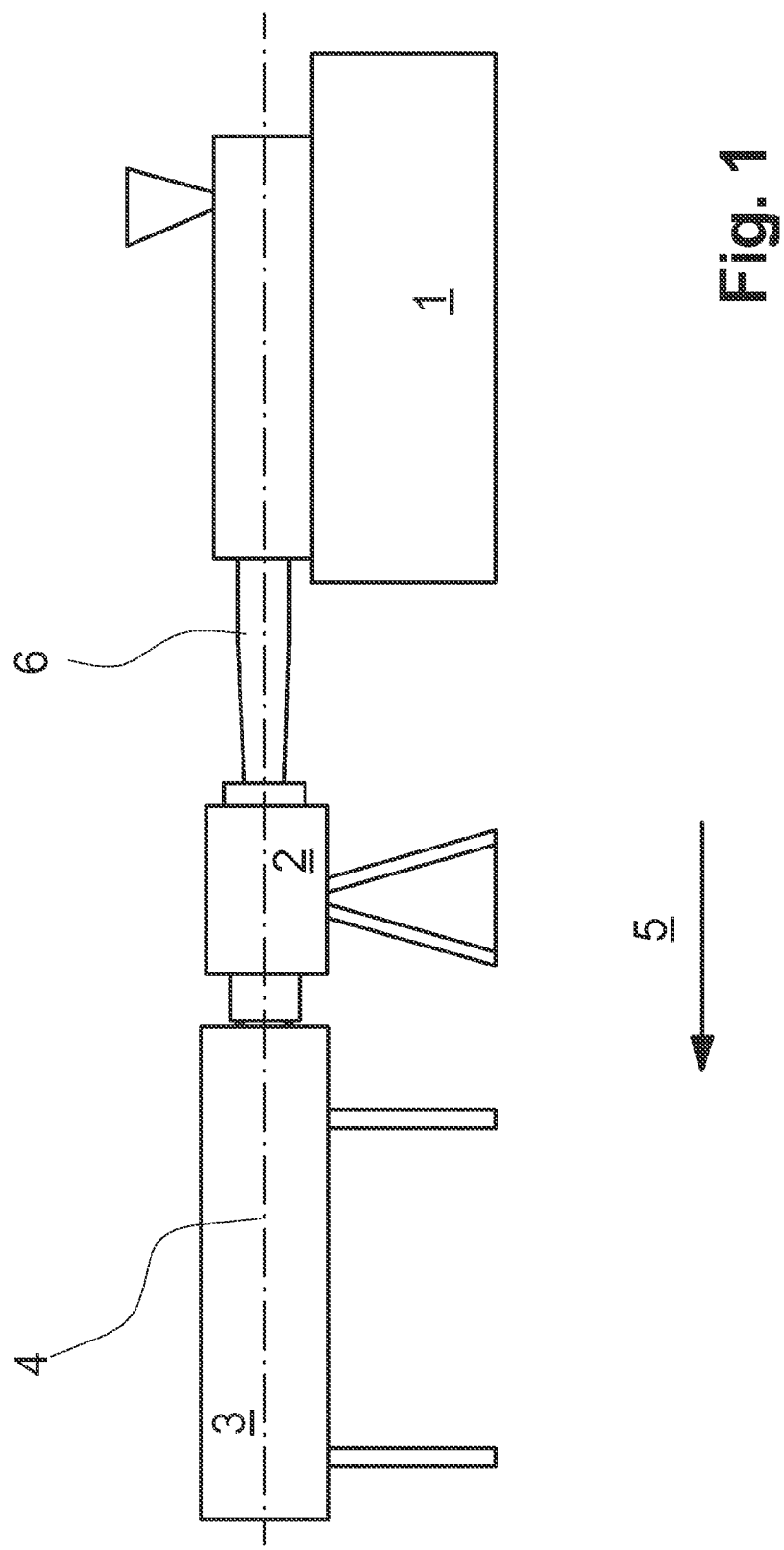
FIG. 1 shows an extrusion line.

An aspect of the invention is to provide a method and a device in which energy is removed in a selective manner from the melt originating from the extruder.

In an embodiment, the present invention includes using a temperature-control element, wherein the polymer melt which flows around the temperature-control element is temperature-controlled, the degree of temperature adjustment being varied by means of the temperature-control element, the degree of temperature adjustment being able to be the same or different at all locations in the temperature-control element.

Owing to this method, it is possible that the melt can be temperature-controlled in a selective manner at various locations in the tool, preferably at a variety of locations around the periphery of the tool. Thus heat cannot be removed from the melt, as would normally be the case, but heat can also be supplied at the desired locations as required. The temperature-control element may be constructed several times. It may comprise individual rods which are joined together to form a block, each of the rods being able to be temperature-controlled individually. This can be carried out both directly, for example, by means of electrical lines, but also indirectly—when suitable material is selected for the rods—for example, by means of induction.

According to a development, however, there is provision for the temperature-control element to be constructed in the manner of a perforated basket and to be provided with one or more apertures, via which the polymer melt is temperature-controlled in a selective manner.

This may be necessary, for example, when the flow behaviour at this location in the tool is unsatisfactory. This temperature control may be carried out by means of a plurality of adaptations of individual parameters or a plurality of parameters.

There is thus provision according to a development for the temperature of the fluid to be changed and consequently for the temperature control to be influenced since, owing to the change of the fluid temperature, the delta temperature between the temperature control medium and the melt is changed.

However, the pressure of the fluid can also be changed, whereby the flow and fluid behaviour of the fluid changes and consequently also the influence of the temperature adjustment on the melt since, when the fluid is conveyed more quickly through the apertures, the temperature transition from the melt to the fluid is also accelerated, since "fresh" cooling medium can repeatedly temperature-control the melt.

The temperature transition to a medium is known to be different when it is in the solid, liquid or gaseous state; it is therefore proposed in another development that the aggregate state of the fluid be changed.

As already described above, the speed of the fluid has an influence on the strength of the temperature adjustment.

According to a development, it is therefore proposed that the throughflow of the fluid in one or more of the apertures be changed. This can be achieved not only by the pressure of the fluid itself, but also by means of narrow locations or extensions in the apertures, whereby the cross-section of the aperture is changed. To this end, it is proposed, for example, via the machine control of the extruder installation, to retract or deploy blocking elements, such as small sliding members, in the cross-section of the apertures.

Owing to all these method steps, it is possible for there to be arranged between the melt input and melt output at least one temperature-control element in the flow channel, around which the polymer melt flows and, in the temperature-control element, the temperature of the melt is influenced in a selective manner by means of the fluid via the apertures which are arranged therein. Owing to this solution, the core flow and consequently the entire polymer melt is effectively temperature-controlled, with heat preferably being removed therefrom. The temperature-control element may be incorporated directly in the flow channel, or be pivoted therein or introduced or guided through it in another manner, depending on requirements.

In the flow channel, there may additionally be arranged a forced distribution element, whereby further homogenisation of the melt is achieved. Optionally, the forced distribution element is at the same time the temperature-control element or the temperature-control element is arranged in or on the forced distribution element.

The apertures in the temperature-control element are constructed as a heat carrier line through which the fluid, this may be water, a heating oil or any fluid which is suitable for temperature adjustment. However, heat carrier media, such as, for example, air, gaseous media, oils, fluid media, metals or solid media may also be used. Furthermore, systems such as, for example, the heat pipe can be used as a heat carrier line.

Since the melt flows around the temperature-control element, energy is transmitted thereto or removed therefrom. This energy is in turn discharged from the system by means of the heat carrier line or supplied thereto as necessary.

It is most practical when the forced distribution element is a perforated basket, a perforated plate or a filter plate. The forced distribution element may be displaced both axially and radially for the transport of energy or for cleaning purposes or guided through the flow channel.

In order to increase the precooling, the predistribution element can also be temperature-controlled by temperature-control elements being introduced into the predistribution element.

In an embodiment, the present invention provides a device including a temperature-control element, where the polymer melt flows around the temperature-control element and can be temperature-controlled, the degree of temperature control being able to be controlled or regulated by means of the temperature-control element.

As already described above, the temperature-control element may comprise individual rods which are joined together to form a block.

According to a development, however, there is first provision for the temperature-control element to be constructed in the manner of a perforated basket, the temperature-control element then having one or more apertures through which a cooling medium can be conveyed.

The apertures in the temperature-control element are a plurality of holes/pipes, which are connected to heat carrier lines.

The term holes is intended to refer not only to round cross-sections, but also to angular or oval cross-sections or cross-sections which are otherwise shaped to facilitate flow. Owing to this embodiment, the melt is now guided past a plurality of temperature-controlled regions, whereby the contact surface between the melt and temperature-control element is increased. The melt is thereby temperature-controlled in an even more effective manner.

The polymer melt is thus flowed around at least one temperature-control element in the flow channel between the melt input and the melt output. As a result, the polymer melt must flow around regions which are already cooled in the flow channel, whereby the polymer melt is cooled in a uniform manner via the complete flow cross-section. The poor heat conduction of the polymer melts is thereby counteracted.

The temperature-control element may be supplied with the heat carrier medium from outside the extrusion line or the heat carrier medium is already guided through the extrusion line and/or has already been used for cooling the product and/or components of the extrusion line.

According to a development, there is provision for the cross-section of the aperture in the temperature-control element to be able to be changed using means. This can be carried out by means of blocking elements in the form of sliding members or the like.

In another development, it is proposed that the aperture(s) in the temperature-control element be lined with a flexible pipe whose cross-section can be changed from the outer side. It is conceivable, for example, in this instance to narrow this flexible portion of the pipe, in a manner similar to using a hose clip in the case of a hose.

Owing to these measures, the overall length of the extrusion line can be shortened since the product inner sides are actively cooled and the melt is additionally precooled in the tool, whereby less energy subsequently has to be removed via the outer surface of the product.

Owing to the cooling power gained, the throughput capacity of the installation can be increased.

The heat carrier medium may, for example, already have been directed through the mandrel of the tool. The tool has an inner cooling, the flow distribution of which can be influenced, there being arranged inside the tool at least one branch for a heat carrier medium. Owing to this branching, which acts in a similar manner to a bypass, the heat carrier medium can be influenced in a selective manner and, consequently, the quantity which is guided through the mandrel is controlled. Subsequently, the heat carrier medium is supplied to the temperature-control element.

FIG. 1 schematically illustrates an extrusion line, the extruder 1 being arranged on the extrusion tool 2. When viewed in the extrusion direction 5, the calibration 3 adjoins the tool 2. This is adjoined by other successive equipment, such as a cooling system, extraction system, and separation device. In the extrusion line illustrated by way of example, a plastics pipe 6 is produced. The calibration 3 may comprise a vacuum tank having an integral calibration sleeve. Other cooling baths may also adjoin the calibration. The extrusion axis is illustrated with the position number 4. The extrusion direction is at the same time the melt flow direction.

Figure 2:
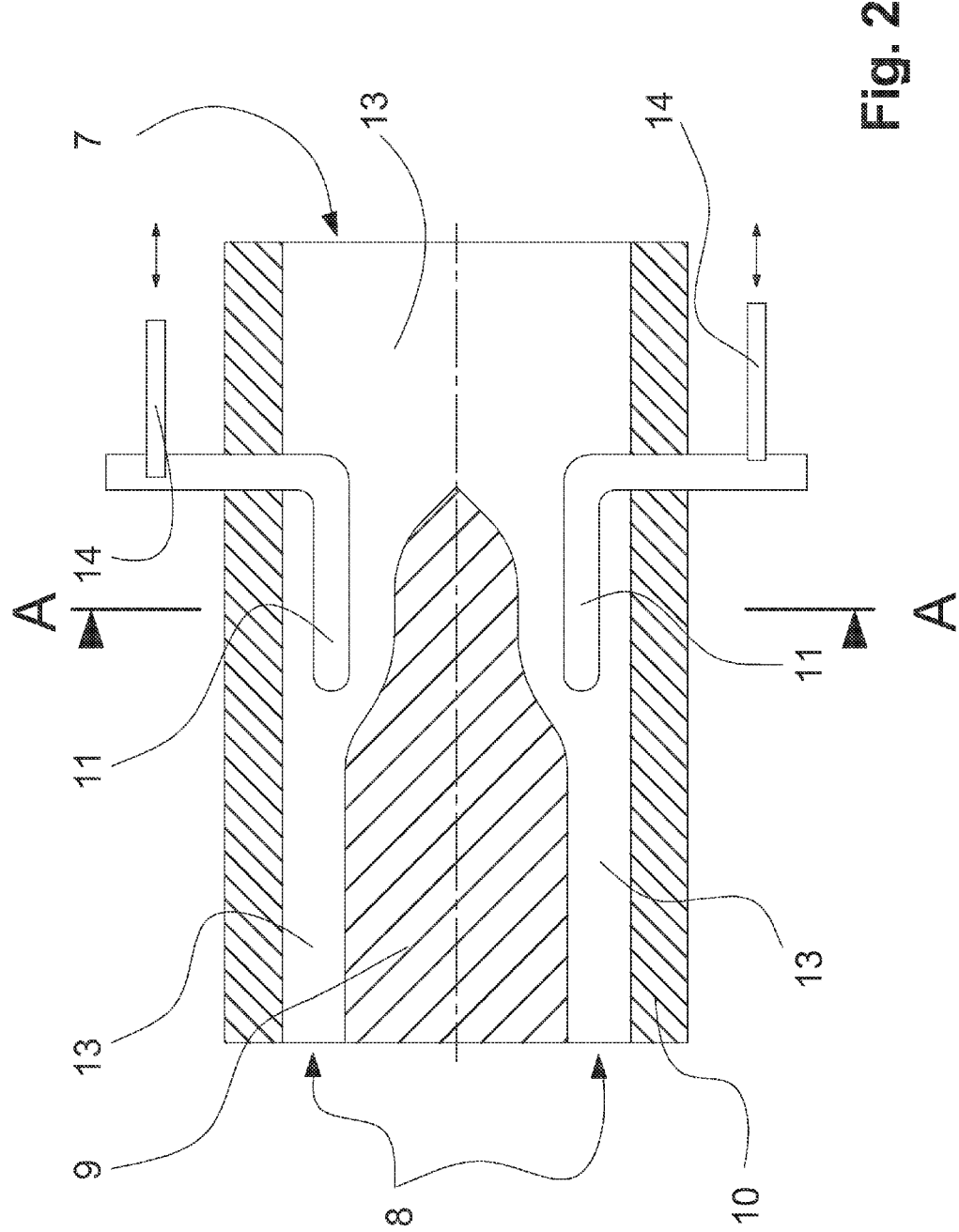
FIG. 2 is a sectioned illustration of a portion of the tool.

FIG. 2 is a sectioned view of the tool, the plane of section being located centrally and along the extrusion axis 5. Between the melt input 7 and the melt output 8, the temperature-control element is illustrated schematically. The melt reaches the melt input 7 from the extruder 1 and is guided via the flow channels 13 into the region of the helical distributor and distributed therewith in a uniform manner radially in the tool 2 and necessarily passes the temperature-control element 11 before it leaves the tool 2 via the melt output 8. The pipes of the temperature-control element 11 which are illustrated only schematically can be changed in their cross-section by the blocking elements 14, and whereby the throughflow and consequently the temperature control capacity of the fluid is influenced. The double-headed arrows illustrated indicate the displacement possibility of the blocking element 14.

Figure 3:
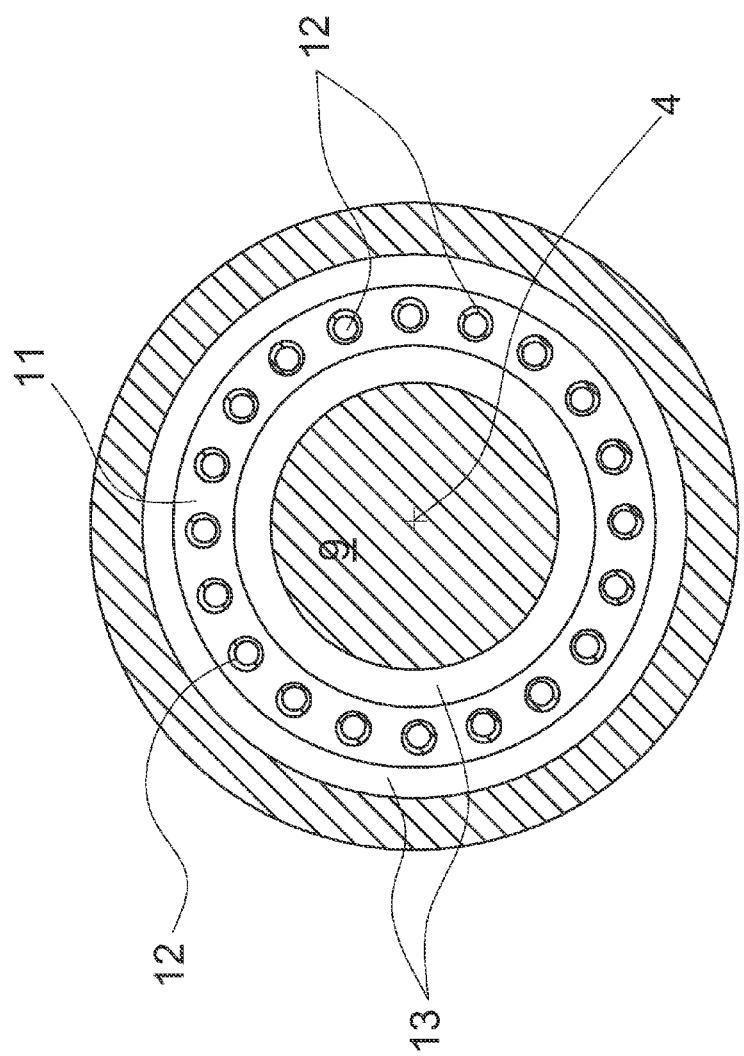
FIG. 3 is a section transversely through the temperature-control element.

FIG. 3 is another cross-section through the tool 2, this cross-section extending transversely relative to the extrusion axis 4 in accordance with the line of section A-A from FIG. 2. The mandrel 9 is illustrated with the extrusion axis 4, which can be seen here only as a point, and the temperature-control element 11 and the sleeve 10. The melt which is guided from the melt input 7 to the melt output 8 necessarily passes the temperature-control element 11 and consequently flows around the apertures 12 through which fluid flows and which are constructed in this instance as holes or pipes, from the inner to the outer flow channel 13.

Figure 4:
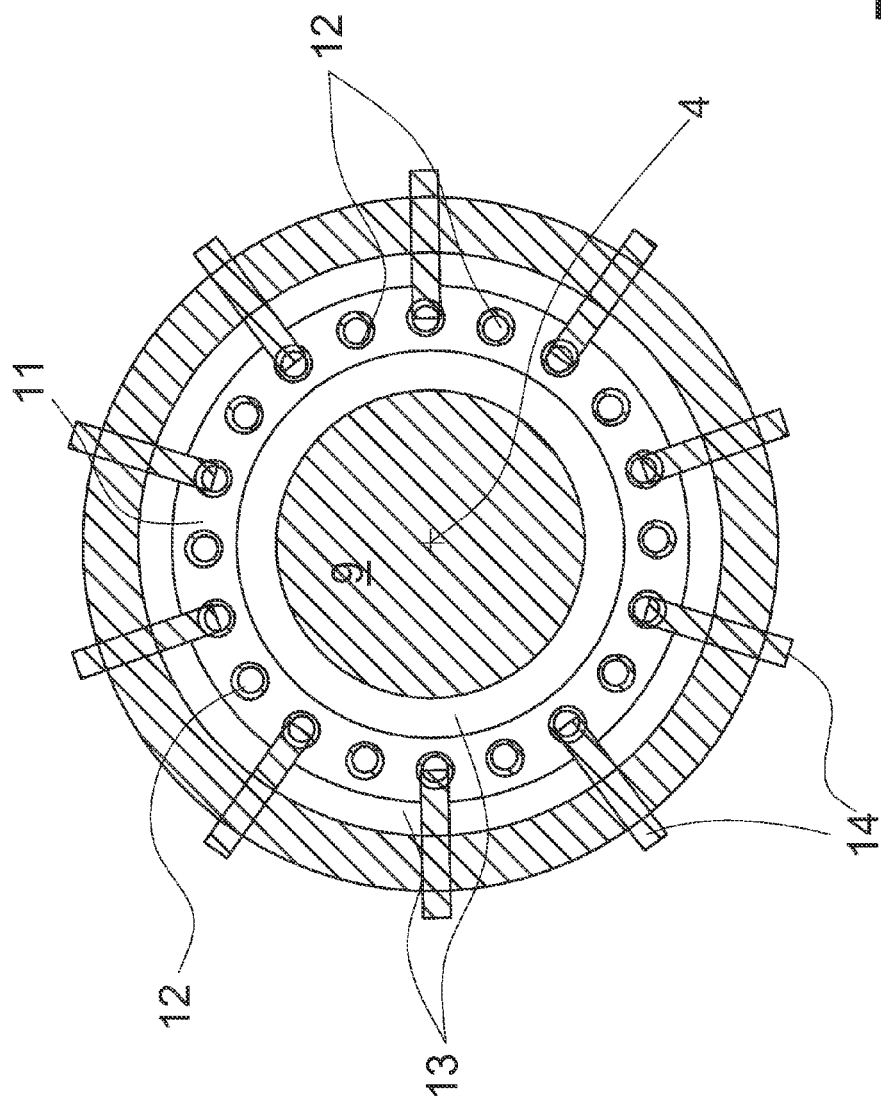
FIG. 4 shows FIG. 3 with the blocking elements.

FIG. 4 shows the cross-section of FIG. 3, the blocking elements 14 for changing the cross-section of the apertures being schematically indicated in this Figure. The blocking elements 14 can be controlled individually, whereby each aperture 12 can be changed in their cross-section to a differing degree.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE NUMERALS

1 Extruder
2 Tool
3 Calibration
4 Extrusion axis
5 Extrusion and melt flow direction
6 Plastics pipe
7 Melt input
8 Melt output
9 Mandrel
10 Sleeve
11 Temperature-control element
12 Aperture in 11
13 Flow channel
14 Blocking element

The invention claimed is:

1. A method for controlling the temperature of a polymer melt in an extrusion tool, the extrusion tool configured to attach to an extruder and receive the polymer melt therefrom, the method comprising:
    flowing a polymer melt via at least one flow channel of the extrusion tool, the flow channel defined by a mandrel and a sleeve surrounding the mandrel, the flow channel extending from at least one melt input in communication with the extruder to at least one melt output and around at least one temperature-control element surrounding the mandrel and disposed in the at least one flow channel, the at least one temperature-control element including a plurality of temperature control units distributed around the temperature-control element;
    controlling a temperature of the polymer melt flowing in the flow channel past the at least one temperature-control element by individually controlling each of the plurality of temperature-control units so as to vary a degree of temperature control of the at least one temperature-control element such that the degree of temperature control is controllable to be the same or different at locations around the mandrel.

2. The method according to claim 1, wherein the extrusion tool is a pipe extrusion tool.

3. The method according to claim 1, wherein the plurality of temperature-control units include apertures through which a fluid flows.

4. The method according to claim 3, wherein a temperature of the fluid is changed.

5. The method according to claim 3, wherein a pressure of the fluid is changed.

6. The method according to claim 3, wherein an aggregate state of the fluid is changed.

7. The method according to claim 3, wherein a throughflow of the fluid is changed in one or more of the apertures.

8. The method according to claim 7, wherein a cross-section of the aperture is changed.

* * * * *